United States Patent
Ogura et al.

(10) Patent No.: US 9,844,771 B2
(45) Date of Patent: Dec. 19, 2017

(54) HYDROCARBON REFORMING/TRAPPING MATERIAL AND METHOD FOR REMOVING HYDROCARBON

(71) Applicants: UniZeo Co., Ltd., Tokyo (JP); THE UNIVERSITY OF TOKYO, Tokyo (JP)

(72) Inventors: Masaru Ogura, Tokyo (JP); Keiji Itabashi, Tokyo (JP); Tatsuya Okubo, Tokyo (JP); Kiyofumi Monma, Tokyo (JP); Palani Elangovan Shanmugam, Tokyo (JP)

(73) Assignees: UniZeo Co., Ltd., Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 14/775,331

(22) PCT Filed: Mar. 10, 2014

(86) PCT No.: PCT/JP2014/056118
§ 371 (c)(1),
(2) Date: Sep. 11, 2015

(87) PCT Pub. No.: WO2014/142053
PCT Pub. Date: Sep. 18, 2014

(65) Prior Publication Data
US 2016/0030933 A1   Feb. 4, 2016

(30) Foreign Application Priority Data
Mar. 12, 2013   (JP) ................. 2013-049539

(51) Int. Cl.
*B01J 29/76* (2006.01)
*B01J 35/00* (2006.01)
(Continued)

(52) U.S. Cl.
CPC ........ *B01J 29/7615* (2013.01); *B01D 53/864* (2013.01); *B01D 53/94* (2013.01);
(Continued)

(58) Field of Classification Search
CPC .................................................. B01J 29/7615
See application file for complete search history.

(56) References Cited

U.S. PATENT DOCUMENTS

| 4,923,690 A | 5/1990 | Valyocsik et al. |
| 5,286,693 A * | 2/1994 | Ino ............. B01J 29/084 502/64 |

(Continued)

FOREIGN PATENT DOCUMENTS

| CN | 101249968 A | 8/2008 |
| DE | 19712727 C1 | 9/1998 |

(Continued)

OTHER PUBLICATIONS

Ogura et al. "Hydrocarbon Reformer Trap by Use of Transition Metal Oxide-Incorporated Beta Zeolites", Catal Lett, Springer, 2007, 118, pp. 72-78, Cited in Specification.

(Continued)

*Primary Examiner* — Melvin C Mayes
*Assistant Examiner* — Stefanie Cohen
(74) *Attorney, Agent, or Firm* — Westerman, Hattori, Daniels & Adrian, LLP

(57) ABSTRACT

To provide a hydrocarbon reforming/trapping material which is capable of adsorbing and reforming a hydrocarbon. A hydrocarbon reforming/trapping material of the present invention has an $SiO_2/Al_2O_3$ ratio of from 7 to 12, and contains an Fe(II)-substituted beta zeolite which is ion-exchanged by Fe(II) ions. The amount of supported Fe(II) is preferably 0.001-0.5 mmol/g with respect to the Fe(II)-substituted beta zeolite. This Fe(II)-substituted beta zeolite (Continued)

is suitably produced by dispersing and mixing a beta zeolite having an $SiO_2/Al_2O_3$ ratio of from 7 to 12 in an aqueous solution of a water-soluble compound of divalent iron, and mixing and stirring the solution, so that Fe(II) ions are supported on the beta zeolite.

11 Claims, 3 Drawing Sheets

(51) Int. Cl.
    *B01J 35/10*   (2006.01)
    *B01D 53/94*   (2006.01)
    *B01D 53/86*   (2006.01)
    *B01J 20/18*   (2006.01)
    *C01B 39/46*   (2006.01)

(52) U.S. Cl.
    CPC .......... *B01D 53/944* (2013.01); *B01J 20/186* (2013.01); *B01J 35/002* (2013.01); *B01J 35/1019* (2013.01); *B01J 35/1023* (2013.01); *B01J 35/1038* (2013.01); *C01B 39/46* (2013.01); *B01D 2253/1085* (2013.01); *B01D 2255/2025* (2013.01); *B01D 2255/20738* (2013.01); *B01D 2255/502* (2013.01); *B01J 2229/186* (2013.01); *B01J 2229/37* (2013.01)

(56) References Cited

U.S. PATENT DOCUMENTS

| | | | |
|---|---|---|---|
| 5,520,895 A | 5/1996 | Sharma et al. | |
| 5,804,155 A * | 9/1998 | Farrauto | B01D 53/944 423/213.2 |
| 6,248,684 B1 | 6/2001 | Yavuz et al. | |
| 6,286,693 B1 * | 9/2001 | Brown | B65D 19/38 211/181.1 |
| 7,501,105 B2 * | 3/2009 | Nagata | B01D 53/9418 423/213.2 |
| 9,108,187 B2 * | 8/2015 | Ogura | C01B 39/065 |
| 2004/0001782 A1 | 1/2004 | Kumar et al. | |
| 2004/0226440 A1 | 11/2004 | Foong et al. | |
| 2005/0201916 A1 | 9/2005 | Yavuz et al. | |
| 2007/0248517 A1 | 10/2007 | Nagata et al. | |
| 2008/0083213 A1 | 4/2008 | Tanada et al. | |
| 2008/0145310 A1 | 6/2008 | Breuninger | |
| 2008/0261803 A1 | 10/2008 | Luo et al. | |
| 2009/0048095 A1 | 2/2009 | Li et al. | |
| 2009/0082194 A1 | 3/2009 | Tissler et al. | |
| 2009/0143221 A1 * | 6/2009 | Ogunwumi | B01D 53/944 502/67 |
| 2010/0137127 A1 | 6/2010 | Kanazawa | |
| 2010/0143224 A1 * | 6/2010 | Li | B01D 53/8628 423/213.5 |
| 2010/0228061 A1 * | 9/2010 | Harkonen | B01D 53/8662 570/262 |
| 2010/0316538 A1 | 12/2010 | Buelow et al. | |
| 2011/0105303 A1 | 5/2011 | Takahashi et al. | |
| 2011/0136657 A1 | 6/2011 | Takamitsu et al. | |
| 2011/0286914 A1 | 11/2011 | Li et al. | |
| 2012/0190534 A1 | 7/2012 | Itabashi et al. | |
| 2013/0045860 A1 | 2/2013 | Xiao | |
| 2013/0156690 A1 | 6/2013 | Itabashi et al. | |
| 2014/0157987 A1 | 6/2014 | Ogura et al. | |
| 2016/0030933 A1 | 2/2016 | Ogura et al. | |

FOREIGN PATENT DOCUMENTS

| | | | | |
|---|---|---|---|---|
| EP | 2876086 A1 | 5/2015 | | |
| JP | 61-10022 A | 1/1986 | | |
| JP | H07-247114 A | 9/1995 | | |
| JP | 2002-321912 A | 11/2002 | | |
| JP | 2007-076990 A | 3/2007 | | |
| JP | 2008-73625 A | 4/2008 | | |
| JP | 2008-519748 A | 6/2008 | | |
| JP | 2008-264702 A | 11/2008 | | |
| JP | 2008-542173 A | 11/2008 | | |
| JP | 2009-520583 A | 5/2009 | | |
| JP | 2010-070450 A | 4/2010 | | |
| JP | 2010-536692 A | 12/2010 | | |
| JP | 2011-116627 A | 6/2011 | | |
| JP | 2012-126632 A | 7/2012 | | |
| JP | WO 2012099090 A1 * | 7/2012 | .......... | C01B 39/065 |
| JP | 2012-162446 A | 8/2012 | | |
| WO | 02/41991 A2 | 5/2002 | | |
| WO | 2006/011575 A1 | 2/2006 | | |
| WO | 2009/023202 A2 | 2/2009 | | |
| WO | 2010/145077 A1 | 12/2010 | | |
| WO | 2010/146156 A1 | 12/2010 | | |
| WO | 2011/013560 A1 | 2/2011 | | |
| WO | 2011/146615 A2 | 11/2011 | | |
| WO | 2012/099090 A1 | 7/2012 | | |

OTHER PUBLICATIONS

International Search Report dated Apr. 8, 2014, issued in counterpart Application No. PCT/JP2014/056118 (2 pages).
Extended Search Report dated Mar. 2, 2016, issued in counterpart European Patent Application No. 14763299.6. (8 pages).
Office Action dated Aug. 13, 2014, issued in counterpart German Patent Application No. 112012004935.7, with Engish translation. ( pages).
Extended (Supplementary) European Search Report dated Jul. 8, 2015, issued in counterpart European Patent Application No. 13820472.2. (6 pages).
Non-Final Office Action dated May 16, 2016, issued in U.S. Appl. No. 14/414,350. (19 pages).
International Search Report dated Apr. 24, 2012, issued in International Application No. PCT/JP2012/050778. (2 pages).
International Search Report dated Aug. 20, 2013, issued in International Application No. PCT/JP2013/069249. (2 pages).
Masaru Ogura, et al., "Stabilization of Bare Divalent Fe(II) Cations in Al-rich Beta Zeolites for Superior NO Adsorption", Journal of Catalysis, vol. 315, (2014) pp. 1-5.
Koutarou Kawakami, et al., "Theoretical Investigation of Novel Two-Step Decomposition of Nitric Oxide Over Fe(II) on-exchanged Zeolites Using DFT Calculations", Catalysis Today, (2014, pp. 1-8.

* cited by examiner

HYDROCARBON REFORMING/TRAPPING MATERIAL AND METHOD FOR REMOVING HYDROCARBON

TECHNICAL FIELD

The present invention relates to a hydrocarbon reforming/trapping material. The present invention also relates to a method for removing hydrocarbon gas in a gaseous phase of the exhaust gas or the like from an internal combustion engine.

BACKGROUND ART

As a catalyst for purifying exhaust gas from an automobile, the use of a beta zeolite which has been ion-exchanged with iron ions has been proposed (refer to Patent Documents 1 to 3). For example, Patent Document 1 discloses a denitration catalyst having a carrier where a beta zeolite having a $SiO_2/Al_2O_3$ mol ratio of 15 to 300 has been ion-exchanged with 0.1 to 15 mass % of $Fe^{3+}$ ions, and ferric oxide supported on this carrier.

Patent Document 2 discloses that an exhaust gas which contains a nitrogen oxide is contacted with a beta zeolite having a framework structure where the Si content percentage attributed to the $Q^4$ of the zeolite framework measured by the $^{29}Si$ MAS NMR spectrum is 35 to 47 mass %, and the mol ratio of $SiO_2/Al_2O_3$ is at least 20 and less than 100, and which has been subjected to ion exchange and supports $Fe^{3+}$.

Patent Document 3 discloses a production method of a $NO_x$ adsorbent. This method includes an impregnation step of impregnating a beta zeolite with an iron chloride aqueous solution to make an iron chloride-containing zeolite, an ion exchange step of ion exchanging Fe by heating the iron chloride containing zeolite at 330° C. to 500° C. under a moisture-free atmosphere, and a heat treatment step of heat treating the iron chloride-containing zeolite after the ion exchange step under a non-oxidizing atmosphere.

Besides these techniques, a hydrocarbon reforming/trapping material has been proposed with the objectives of increasing the purifying efficiency of the hydrocarbon by a three-way catalyst which is a purification catalyst for exhaust gas from an automobile, and economizing the use of noble metals, where for a hydrocarbon temporarily captured inside a zeolite micropore having a metal oxide, the complete purification temperature of the hydrocarbon is reduced by reforming the hydrocarbon to a chemical species with higher reactivity, with the result that it becomes possible to economize the use of noble metals (refer to Patent Document 4 and Non-Patent Document 1).

Patent Document 1: Pamphlet of PCT International Publication No. WO2006/011575
Patent Document 2: Japanese Unexamined Patent Application, Publication No. 2007-076990
Patent Document 3: Japanese Unexamined Patent Application, Publication No. 2008-264702
Patent Document 4: Japanese Unexamined Patent Application, Publication No. 2008-073625
Non-Patent Document 1: M. Ogura, T. Okubo, and S. P. Elangovan, Catal. Lett., 118, 72(2007).

DISCLOSURE OF THE INVENTION

Problems to be Solved by the Invention

However, when carrying out the catalytic removal of hydrocarbons, in the case that the temperature of the exhaust gas is low, even if the materials disclosed in the above described Patent Documents 1 to 3 are used, it is not easy to effectively adsorb and remove the hydrocarbons.

According to the technique disclosed in Non-Patent Document 1, a hydrocarbon such as a toluene or the like trapped in a zeolite is reformed, and oxidized to a benzaldehyde or benzoate, therefore, this has the advantage that a three-way catalyst acts at a lower temperature. However, it is not easy to oxidize a hydrocarbon to a degree where a three-way catalyst is not used at all.

The objective of the present invention is to provide a hydrocarbon reforming/trapping material which can overcome the various disadvantages of the above described prior art, and a method for removing hydrocarbons.

Means for Solving the Problems

The present inventors, as a result of diligent research, found that the above objective was achieved by using an Fe(II)-substituted beta zeolite made by ion exchange with a divalent iron, and which further has a specified $SiO_2/Al_2O_3$ ratio.

Namely, the present invention provides a hydrocarbon reforming/trapping material comprising an Fe(II)-substituted beta zeolite which has been ion-exchanged with Fe(II) ions, and where the $SiO_2/Al_2O_3$ ratio is from 7 to 12.

Further, the present invention provides a method for removing a hydrocarbon wherein an Fe(II)-substituted beta zeolite which has been ion-exchanged with Fe(II) ions, and where the $SiO_2/Al_2O_3$ ratio is from 7 to 12, is contacted with a hydrocarbon or a gas comprising a hydrocarbon, the hydrocarbon is adsorbed on the Fe(II)-substituted beta zeolite, the Fe(II)-substituted beta zeolite on which the hydrocarbon is adsorbed is heated under the presence of oxygen, and the hydrocarbon is reformed and removed.

Effects of the Invention

According to the present invention, when carrying out catalytic removal of a hydrocarbon, it is possible to not only adsorb a hydrocarbon, but also to oxidize an adsorbed hydrocarbon to carbon dioxide.

PREFERRED MODE FOR CARRYING OUT THE INVENTION

Figure 1:
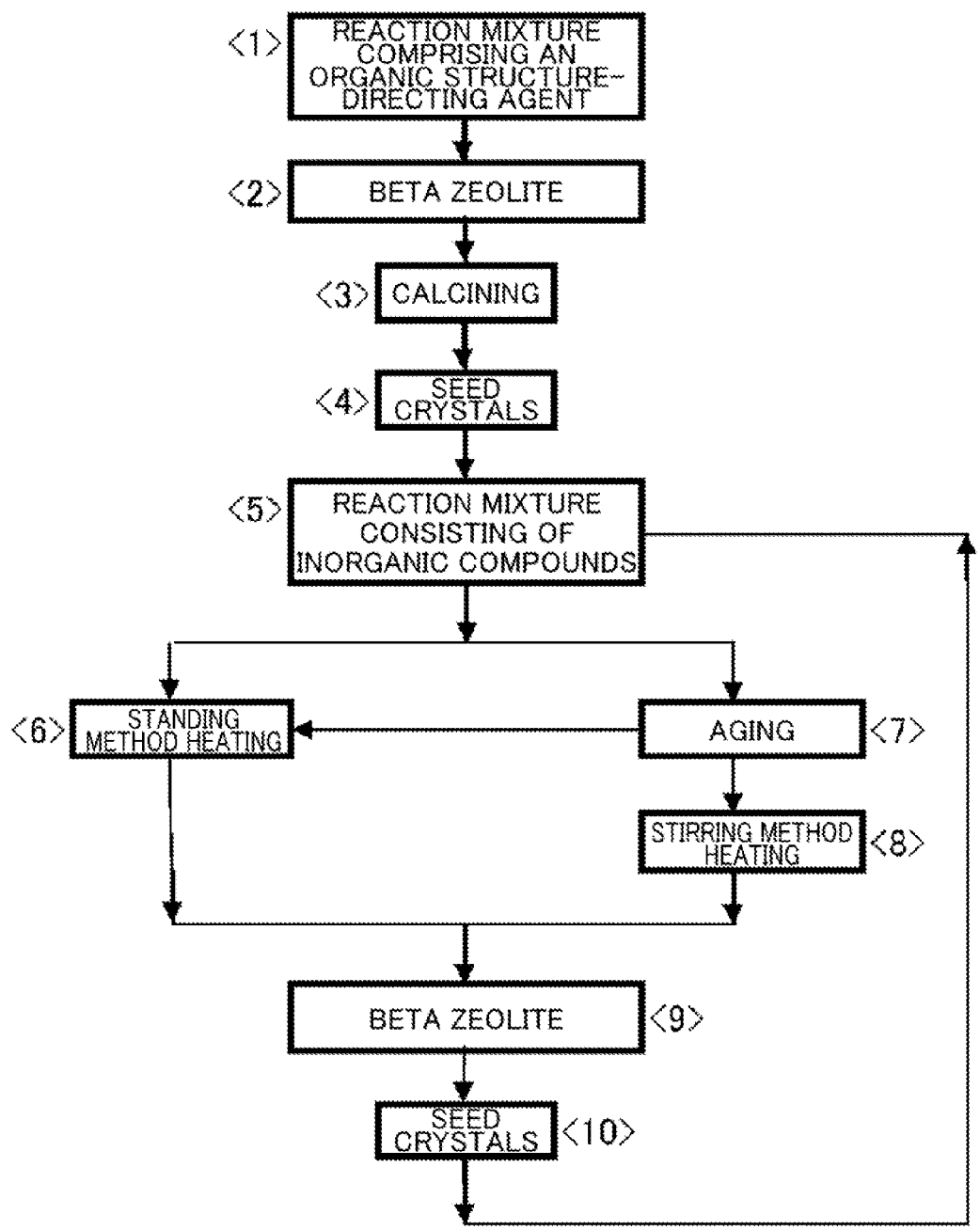
FIG. 1 is a flowchart for producing a beta zeolite before substitution used in the present invention.

Below, the present invention will be explained based on preferable embodiments thereof. The present invention is one which relates to a hydrocarbon reforming/trapping material comprising an Fe(II)-substituted beta zeolite obtained by ion exchanging a beta zeolite with Fe(II) ions. A hydrocarbon reforming/trapping material is a material which, after having temporarily trapped a hydrocarbon by adsorption, can reform the trapped hydrocarbon to another material.

In the Fe(II)-substituted beta zeolite used in the present invention, the Fe(II) ion is ion-exchanged with the cation present at the $[AlO_2]^-$ site in the beta zeolite, whereby it is supported on the beta zeolite. An important point of the present invention is the point that the iron ion that is ion-exchanged with the cation included in the beta zeolite is an Fe(II) ion. In the case that the iron ion that is ion-exchanged with the cation is an Fe(III) ion, the desired level of gas removal effect will not be exhibited. The present inventors believe that the reason for this is related to the use, as the beta zeolite, of one having the physical properties specified later.

In the case that the iron ion that is ion-exchanged with the cation is an Fe(III) ion, the desired level of gas removal effect will not be exhibited. However, this matter does not prevent the Fe(II)-substituted beta zeolite used in the present invention from supporting Fe(III) ions thereon. Namely, it is allowed that Fe(III) ions are supported on the Fe(II)-substituted beta zeolite.

In the present invention, the gas which is the objective of the reforming/trapping using the Fe(II)-substituted beta zeolite is, for example, a hydrocarbon gas which is a gas included in the exhaust gas from an internal combustion engine. Concerning the hydrocarbon gas, the Fe(II)-substituted beta zeolite is, in particular, effective for the reforming/trapping of alkanes such as methane, ethane, propane, butane, pentane, hexane, n-heptane, isooctane, and the like, alkenes such as ethylene, propylene, butene, pentene, methyl pentene, hexene, methyl hexene, and the like, aromatic compounds such as benzene, toluene, xylene, trimethyl benzene and the like. Especially, as illustrated in the Examples described later, concerning toluene, which is a typical hydrocarbon included in the exhaust gas from an internal combustion engine, the Fe(II)-substituted beta zeolite of the present invention, after adsorbing the toluene, can oxidize the same to carbon dioxide under the presence of oxygen, for example in air.

The amount of Fe(II) included in the Fe(II)-substituted beta zeolite, namely the supported amount, with respect to the Fe(II)-substituted beta zeolite is preferably 0.001 to 0.5 mmol/g, more preferably 0.01 to 0.48 mmol/g, and 0.15 to 0.45 mmol/g is preferable. By setting the range of the supported amount of the Fe(II), the adsorption efficiency of the hydrocarbon, and the oxidation of the hydrocarbon can be effectively increased.

The supported amount of the Fe(II) included in the Fe(II)-substituted beta zeolite is measured by the following method. First, the Fe(II)-substituted beta zeolite to be subjected to measurement is weighed. This Fe(II)-substituted beta zeolite is dissolved with hydrofluoric acid (HF), and the total amount of iron in the dissolved fluid is measured using an inductively coupled plasma emission spectrophotometer. Separately, the amount of Fe(III) in the Fe(II)-substituted beta zeolite to be subjected to measurement is measured by $H_2$-TPR (temperature programmed reduction). Then, the amount of Fe(II) is calculated by deducting the amount of Fe(III) from the total amount of iron.

To make the beta zeolite support the Fe(II) ions, for example, the following method may be adopted. A beta zeolite is dispersed in an aqueous solution of a water soluble compound of divalent iron, and stirred and mixed. The beta zeolite is preferably mixed in a ratio of 0.5 to 7 parts by mass with respect to 100 parts by mass of the previously mentioned aqueous solution. The added amount of the water soluble compound of the divalent iron should be appropriately set depending on the degree of the ion exchange.

The mixing and stirring may be carried out at room temperature, or may be carried out under heating. In the case of carrying out the mixing and stirring under heating, it is preferable to set the fluid temperature to 10 to 30° C. Further, the mixing and stirring may be carried out under an air atmosphere, or may be carried out under an inert gas atmosphere such as a nitrogen atmosphere or the like.

When mixing and stirring, a compound to prevent the oxidation of divalent iron to trivalent iron may be added into water. As such a compound, ascorbic acid, which is a compound which does not hinder the ion exchange of Fe(II) ions, and further prevents the oxidation of Fe(II) to Fe(III), is preferable. The added amount of ascorbic acid is 0.1 to 3 times the mol number of the added divalent iron, and 0.2 to 2 times is particularly preferable, from the viewpoint of effectively preventing the oxidation of the divalent iron.

After having carried out the mixing and stirring for a prescribed time, the solid portion is suction filtered, washed with water and dried, to obtain the target Fe(II)-substituted beta zeolite. The X-ray diffraction pattern of this Fe(II)-substituted beta zeolite is approximately the same as the X-ray diffraction pattern of the beta zeolite before it is made to support the Fe(II) ions. Namely, the crystal structure of the zeolite is not changed by the ion exchange.

The Fe(II)-substituted beta zeolite used in the present invention is preferably one which has been obtained by ion exchanging Fe(II) ions in a beta zeolite which has been produced using a reaction mixture which does not contain a structure-directing agent. A suitable production method for such a beta zeolite will be described later.

The Fe(II)-substituted beta zeolite used in the present invention has a $SiO_2/Al_2O_3$ ratio of from 7 to 12, preferably from 8 to 11.5, and more preferably from 8.8 to 11. Namely, the Fe(II)-substituted beta zeolite has a low $SiO_2/Al_2O_3$ ratio. Generally, in a zeolite, a low $SiO_2/AlO_3$ ratio means that there is a large number of ion exchange sites. In other words, this means that there is a high ability to support Fe(II) ions. As a result of the study by the present inventors, it was unexpectedly revealed that an Fe(II)-substituted beta zeolite with a low $SiO_2/AlO_3$ ratio can increase the number of molecules of hydrocarbons which one Fe(II) ion can adsorb. Accordingly, by using the Fe(II)-substituted beta zeolite of the present invention, it is possible to efficiently adsorb a hydrocarbon. Further, after having adsorbed hydrocarbons such as toluene or the like, it is possible to oxidize them to carbon dioxide.

The Fe(II)-substituted beta zeolite used in the present invention, in addition to comprising the above described $SiO_2/Al_2O_3$ ratio, also preferably has a BET specific surface area of 300 to 600 m$^2$/g, especially 320 to 550 m/g, and particularly 350 to 500 m$^2$/g. Further, the micropore specific surface area is preferably 270 to 500 m$^2$/g, especially 270 to 450 m$^2$/g, and particularly 270 to 400 m$^2$/g. Further, the micropore volume is preferably 0.14 to 0.25 m=/g, especially 0.14 to 0.22 m$^2$/g, and particularly 0.14 to 0.21 m$^2$/g. By using an Fe(II)-substituted beta zeolite comprising such physical properties, the hydrocarbon reforming/trapping characteristics are improved. In particular, it is possible to more reliably carry out the oxidation of hydrocarbons such as toluene and the like. Further, as described later, these physical properties do not change greatly for the corresponding beta zeolite before being ion-exchanged with the Fe(II) ions.

The Fe(II)-substituted beta zeolite used in the present invention may include lithium. In this way, it is easy to obtain an Fe(II)-substituted beta zeolite having a low $SiO_2/Al_2O_3$ ratio. The amount of lithium included in the Fe(II)-substituted beta zeolite is preferably 0.001 to 0.4 mmol/g, and more preferably 0.001 to 0.3 mmol/g with respect to the Fe(II)-substituted beta zeolite.

The Fe(II)-substituted beta zeolite used in the present invention is one which especially excellent in the trapping ability of hydrocarbons emitted when cold starting an internal combustion engine. When cold-starting a gasoline engine or a diesel engine, the temperature of a three-way catalyst has not become sufficiently high, therefore, it is difficult to carry out effective purification of the exhaust gas by a three-way catalyst, whereas by using, separately from the three-way catalyst, an adsorbent (catalyst) including the Fe(II)-substituted beta zeolite used in the present invention, it is possible to trap hydrocarbons included in the exhaust gas at a relatively low temperature (for example, on the order of −40° C. to 200° C.) at the time of cold starting, and the exhaust gas can be purified. Once several minutes have passed from a cold start, the temperature of the exhaust gas increases from that of the cold start, and reaches to the order of 50° C. to 400° C., and the hydrocarbons trapped in the Fe(II)-substituted beta zeolite used in the present invention are reformed under the presence of oxygen, and released. The degree of reforming, in the case that the hydrocarbon is, for example, toluene, is such that the toluene is reformed at least to benzene, and preferably oxidized to carbon dioxide. The reason that such oxidation arises is not clear at present, but it is thought that the iron chemical species included in the Fe(II)-substituted beta zeolite and atmospheric oxygen make a large contribution. Here, as the iron chemical species, for example the Fe(II) ions present at the ion exchange sites of the beta zeolite, and the ferric oxide (III) present at the surface of the zeolite can be mentioned. It is preferable that the concentration of the oxygen in the atmosphere is 1 vol % to 40 vol %.

As described above, according to the reforming/trapping material of the present invention, it is possible to purify exhaust gas without using a three-way catalyst which has so far been used for the purification of the exhaust gas of an internal combustion engine. However, this does not at all prevent the use of a three-way catalyst, and does not at all hinder the co-use of the reforming/trapping material of the present invention with a three-way catalyst. In the case of co-use with a three-way catalyst, the substance reformed by the reforming/trapping material of the present invention is purified by the three-way catalyst at a lower operating temperature compared to the hydrocarbon before reforming, therefore, this has the advantage that the operating temperature of the three-way catalyst can be lowered.

As the beta zeolite which is a zeolite which is ion-exchanged with Fe(II) ions, it is preferable to use a beta zeolite having the physical properties specified in the present invention. In more detail, the beta zeolite used in the present invention (below, this zeolite is referred to as the "beta zeolite before substitution", in contrast to the Fe(II)-substituted beta zeolite) has one characteristic in the point that the $SiO_2/Al_2O_3$ ratio is low and it is aluminum rich. In more detail, the beta zeolite before substitution is preferably one which has a $SiO_2/Al_2O_3$ ratio of 7 to 12, more preferably 8 to 11.5, and even more preferably 8.8 to 11, and is aluminum rich. Such an aluminum rich beta zeolite before substitution preferably has a BET specific surface area measured in a sodium type state of 300 to 700 $m^2/g$, more preferably 350 to 600 $m^2/g$. Further, the micropore specific surface area measured in a sodium type state is preferably 270 to 500 $m^2/g$, more preferably 380 to 500 $m^2/g$. Furthermore, the micropore volume measured in a sodium type state is preferably 0.14 to 0.25 $cm^3/g$, more preferably 0.14 to 0.21 $cm^3/g$.

As described above, the values of the $SiO_2/Al_2O_3$ ratio, the BET specific surface area, the micropore specific surface area, and the micropore volume for the beta zeolite before substitution are not greatly changed from the corresponding values for the Fe(II)-substituted beta zeolite.

The beta zeolite before substitution encompasses those of the sodium type, and further encompasses those of the H+ type where the sodium ions are ion-exchanged with protons. In the case that the beta zeolite is an H+ type, the measurement of the above described specific surface area is carried out after the sodium ions have been substituted with protons. To convert a sodium type beta zeolite to an H+ type, for example, a sodium type beta zeolite is dispersed in an ammonium salt aqueous solution of ammonium nitrate or the like, and the sodium ions in the zeolite are substituted with ammonium ions. By calcining this ammonium type beta-zeolite, an H+ type beta zeolite is obtained.

The above described specific surface areas and volumes, as described later in the Examples, are measured using a BET surface area measuring device.

The aluminum rich beta zeolite before substitution having the above described physical properties can be appropriately produced using the later described production method. In the present invention, the reason why the beta zeolite before substitution was able to achieve the above described physical properties is presumed to be that, by using this production method, it was possible to suppress the generation of defects arising in the crystal structure of the obtained beta zeolite before substitution, but the details are not clear.

Next a suitable production method of the beta zeolite before substitution is explained with reference to FIG. 1. In FIG. 1, a synthesis method of a beta zeolite of the prior art using an organic Structure-Directing Agent (SDA) is carried out in the sequence of <1>, <2>, and <3>. Further, a method where <1>, <2>, <3>, <4>, <5>, <6>, and <9> are carried out in sequence is also known (for example, refer to the specification of Chinese Patent Application Publication No. 101249968A; below referred to as the "prior art method"). In the prior art method, the use of seed crystals is essential, and in order to produce the seed crystals, a structure-directing agent (below referred to as "SDA") of an organic compound referred to as tetraethylammonium ion is essential. Further, because the beta zeolite obtained by the prior art method is used as a seed crystal, it is necessary to remove the tetraethylammonium ions by high temperature calcination.

In contrast to this method, in the present invention, it is preferable to produce the beta zeolite before substitution using a reaction mixture which does not include a structure-directing agent. Specifically, in the following six ways, it is possible to produce the beta zeolite before substitution. The first method is a method where the same <1>, <2>, <3>, <4>, <5>, <6>, and <9> as the prior art method are carried out in sequence. However, the reaction conditions differ from the prior art method. Consequently, according to the present invention, it is possible to produce a beta zeolite before substitution with a low $SiO_2/Al_2O_3$ ratio. The second method is a method where <1>, <2>, <3>, <4>, <5>, <7>, <6>, and <9> are carried out in sequence. In this method, it is possible to effectively use seed crystals with a low $SiO_2/Al_2O_3$ ratio, by standing and heating after having carried out aging.

The third method is a method where <1>, <2>, <3>, <4>, <5>, <7>, <8>, and <9> are carried out in sequence. This method also differs from the prior art method in the reaction conditions.

In the present production method, the following three sequences are also possible.

<10>, <5>, <6>, and <9>
<10>, <5>, <7>, <6>, and <9>
<10>, <5>, <7>, <8>, and <9>

In these cases, the $SiO_2/Al_2O_3$ ratio of the seed crystals, and the reaction conditions such as the composition of the reaction mixture and the like also differ from the prior art method. Moreover, in these three methods, as the used seed crystal, the beta zeolite before substitution obtained by the method of the present invention is used. Namely, in these three production methods, the seed crystal can be iteratively used, therefore, an organic SDA is essentially not used. In brief, these three production methods can be called production methods for a beta zeolite by green processes make where the environmental burden is ultimately low.

The production method of the beta zeolite before substitution used in the present invention is now explained in more detail. The method of the sequence of <1>, <2>, and <3> in FIG. 1 is the same as the method using the organic SDA of the prior art. Concerning the seed crystal of <4> in FIG. 1, in the prior art method, the range of the $SiO_2/Al_2O_3$ ratio of the seed crystal is limited to a narrow range of 22 to 25. In contrast, in the present production method, the $SiO_2/Al_2O_3$ ratio of the seed crystal shown in <4> of FIG. 1 is one characteristic. In the present production method, it is possible to use seed crystals with a range of the $SiO_2/Al_2O_3$ ratio of 8 to 30. Because it is very difficult to synthesize a beta zeolite where the $SiO_2/Al_2O_3$ ratio of the seed crystals is less than 8, this is generally not used. Further, if the $SiO_2/Al_2O_3$ ratio of the seed crystals exceeds 30, the product will readily become ZSM-5 regardless of the composition of the reaction mixture. Further, the added amount of the seed crystals in the present production method is within the range of 0.1 to 20 mass % with respect to the silica component included in the reaction mixture. It is preferable for this added amount to be small, but it can be determined in consideration of the reaction speed, depression effects of impurities and the like. Preferably, the added amount is 1 to 20 mass %, more preferably the added amount is 1 to 10 mass %.

The average particle size of the beta zeolite seed crystals used in the present production method is 150 nm or more, preferably 150 to 1000 nm, and more preferably 200 to 600 nm. The size of the crystals of the beta zeolite before substitution obtained by synthesis is generally not uniform, and to some degree has a particle size distribution, and it is not difficult to determine the crystal particle size having the greatest frequency therein. The average particle size indicates the particle diameter of the crystals having the highest frequency as observed by scanning electron microscopy. A beta zeolite using an organic SDA generally has a small average particle size, generally in the range of 100 nm to 1000 nm. However, because small particles agglomerate, the particle size is unclear, or ones exceeding 1000 nm can be present. Further, in order to synthesize crystals below 100 nm, special devices are required, and this becomes costly. Accordingly, in the present production method, a beta zeolite with an average particle size of 150 nm or more is used as the seed crystals. The beta zeolite before substitution obtained by the present production method also has this range of average particle sizes, therefore, it can suitably be used as seed crystals.

The reaction mixture to which the seed crystals are added is, for example, obtained by mixing a silica source, alumina source, alkali source, and water so as to make a composition shown by the mole ratios shown below. If the composition of the reaction mixture is outside of this range, it is not easy to obtain the target beta zeolite before substitution.

$SiO_2/Al_2O_3$=6 to 40
$Na_2O/SiO_2$=0.05 to 0.25
$Li_2O/SiO_2$=0.005 to 0.25
$H_2O/SiO_2$=5 to 50

More preferably, the range of the composition of the reaction mixture is as below.

$SiO_2/Al_2O_3$=10 to 40
$Na_2O/SiO_2$=0.1 to 0.25
$Li_2O/SiO_2$=0.01 to 0.15
$H_2O/SiO_2$=10 to 25

As the silica source used in order to obtain a reaction mixture having the above mentioned mole ratios, silica itself, or silicon containing compounds which can generate silicate ions in water can be mentioned. Specifically, wet process silica, dry process silica, colloidal silica, sodium silicate, aluminosilicate gel, and the like may be mentioned. These silica sources may be used individually or combinations of 2 or more may be used. Among these silica sources, the use of silica (silicon dioxide) is preferable in the point that it is possible to obtain a zeolite without unnecessary accompanying byproducts.

As an alumina source, for example, it is possible to use a water soluble aluminum containing compound. Specifically, sodium aluminate, aluminum nitrate, aluminum sulfate and the like may be mentioned. Further, aluminum hydroxide is also one suitable alumina source. These alumina sources may be used individually or combinations of 2 or more may be used. Among these alumina sources, the use of sodium aluminate or aluminum hydroxide is preferable in the point that it is possible to obtain a zeolite without unnecessary accompanying byproducts (for example, sulfates or nitrates or the like).

As the alkali source, for the case of sodium, for example, it is possible to use sodium hydroxide. For the case of lithium, lithium halides such as lithium chloride, lithium bromide and the like, or lithium salts such as lithium acetate and the like may be used, and lithium hydroxide may also be used. Further, in the case of using sodium silicate as the silica source, or in the case of using sodium aluminate as the alumina source, the sodium which is the alkali metal component included therein is at the same time considered to be NaOH, which is also the alkali component. Accordingly, the above mentioned $Na_2O$ is calculated as the sum of all of the alkali components in the reaction mixture.

As the reaction mixture, in the case of using one having the composition indicated below, even if lithium ions are not included in the reaction mixture, it is possible to obtain the target beta zeolite before substitution.

$SiO_2/Al_2O_3$=40 to 200
$Na_2O/SiO_2$=0.22 to 0.4
$H_2O/SiO_2$=10 to 50

More preferably, the range of the composition of the reaction mixture is as below.

$SiO_2/Al_2O_3$=44 to 200
$Na_2O/SiO_2$=0.24 to 0.35
$H_2O/SiO_2$=15 to 25

As the composition of the reaction mixture, adopting the following ranges is also preferable.

SiO$_2$/Al$_2$O$_3$=10 to 40
Na$_2$O/SiO$_2$=0.05 to 0.25
H$_2$O/SiO$_2$=5 to 50

More preferably, the range of the composition of the reaction mixture is as below.

SiO$_2$/Al$_2$O$_3$=12 to 40
Na$_2$O/SiO$_2$=0.1 to 0.25
H$_2$O/SiO$_2$=10 to 25

For the addition sequence of each raw material when preparing the reaction mixture, a method which easily provides a uniform reaction mixture should be adopted. For example, under room temperature, the alumina source and the lithium source are added to, and dissolved in, a sodium hydroxide aqueous solution, and next, the silica source is added with stirring and mixing whereby it is possible to obtain a uniform reaction mixture. The seed crystals can be added with the silica source while mixing, or can be added after having added the silica source. After this, stirring and mixing are performed so as to uniformly distribute the seed crystals. The temperature when preparing the reaction mixture is not particularly restricted, and this generally should be carried out at room temperature (20 to 25° C.).

The reaction mixture including the seed crystals is introduced into a closed container, heated and allowed to react, and a beta zeolite crystallizes. This reaction mixture does not include an organic SDA. One method for carrying out the crystallization, as shown in the prior art method, is heating by the standing method, without aging (the sequence of <4>, <5>, <6>, and <9>).

On the other hand, in the case of using seed crystals having a low SiO$_2$/Al$_2$O$_3$ ratio, after aging, heating without stirring facilitates the progress of crystallization (the sequence of <4>, <5>, <7>, <6>, and <9>). Aging refers to the operation of holding for a predetermined time at a temperature which is a lower temperature than the reaction temperature. In the aging, generally, standing occurs without stirring. It is known that by carrying out aging, it is possible to display the effects such as preventing impurity byproducts, allowing heating while stirring without impurity byproducts, increasing the reaction speed, and the like, but the mechanism of action is not necessarily clear. The temperature and time of the aging can be set so as to exert the above mentioned effects to their maximum. In the present production method, aging is preferably carried out in a range of 20 to 80° C., more preferably 20 to 60° C., and preferably for 2 hours to 1 day.

In the case of stirring with the aim of homogenization of the reaction mixture during heating, if the heating and stirring are carried out after having carried out the aging, it is possible to prevent impurity byproducts (the sequence of <4>, <5>, <7>, <8>, and <9>). Stirring is carried out to homogenize the composition and temperature of the reaction mixture, and can be by mixing by stirring blades, mixing by rotation of the vessel, and the like. The stirring intensity and rotation rate should be adjusted depending on the uniformity of the temperature and the conditions of the impurity byproducts. The stirring does not have to be continuous, and may be intermittent. By such a combination of aging and stirring, industrial bulk production becomes possible.

The below described three methods are production methods of a beta zeolite before substitution by green processes which is are characteristics of the present production method. According to these three methods, unlimited self-reproduction becomes possible using the beta zeolite before substitution obtained by the present production method as seed crystals, and a production process which completely avoids the use of an organic SDA become possible. Namely, there are the method of the sequence <10>, <5>, <6>, and <9>, the method of the sequence <10>, <5>, <7>, <6>, and <9>, and the method of the sequence <10>, <5>, <7>, <8>, and <9>. The characteristics of the respective steps are as described above. In the case of carrying out stirring and heating, it is preferable to carry out aging.

In the case of both the standing method and the stirring method, the heating temperature is in the range of 100 to 200° C., preferably 120 to 180° C., and the heating is under self-pressurization. At temperatures of less than 100° C., the crystallization speed becomes extremely slow, and therefore, the production efficiency of the beta zeolite worsens. On the other hand, at temperatures exceeding 200° C., not only do high compressive strength autoclaves become necessary, which is an economic drawback, but also the production speed of impurities is accelerated. The heating time is not critical in the present production method, and heating should be done until a beta zeolite of sufficiently high crystallinity is obtained. Generally, by heating on the order of 5 to 150 hours, it is possible to obtain a beta zeolite with sufficient crystallinity before substitution.

By heating as described above, crystals of a beta zeolite before substitution can be obtained. After the heating is finished, the produced crystal powder is separated from the mother liquor by filtration, and after this, it is washed with water or hot water, and dried. In the state as dried, organic compounds are not included, and therefore, calcination is not necessary.

A beta zeolite before substitution obtained in this way is ion-exchanged with Fe(II) ions as previously described to make an Fe(II)-substituted beta zeolite. The Fe(II)-substituted beta zeolite may be used in this state as-is, as a hydrocarbon reforming/trapping material, or may be used as a reforming/trapping material comprising this Fe(II)-substituted beta zeolite. For the Fe(II)-substituted beta zeolite in any form, by putting the Fe(II)-substituted beta zeolite in solid-gas contact with a hydrocarbon, the gas can be trapped by adsorption in the Fe(II)-substituted beta zeolite, and further it is possible to reform the trapped hydrocarbon.

In the present invention, in addition to removing a hydrocarbon gas by contacting the hydrocarbon gas itself with the Fe(II)-substituted beta zeolite, it is also possible to contact a gas comprising a hydrocarbon gas with the Fe(II)-substituted beta zeolite, and remove the hydrocarbon gas from this gas. As examples of such as gas, the exhaust gas from an internal combustion engine which uses gasoline or a hydrocarbon such as a light oil or the like as fuel, or the exhaust gas generated by various boilers or incinerators or the like may be mentioned. Especially, concerning a hydrocarbon such as toluene or the like, a hydrocarbon gas comprising toluene is adsorbed on the Fe(II)-substituted beta zeolite, then the Fe(II)-substituted beta zeolite on which at least the toluene is adsorbed is heated under the presence of oxygen whereby the toluene is reformed, and the toluene is reformed at least to benzene, and preferably can be oxidized to carbon dioxide.

EXAMPLES

Below, the present invention is explained in further detail by Examples. However, the scope of the present invention is not limited by these examples. In particular, unless otherwise noted, "%" means "mass %". Further, the analysis devices used in the following Examples, Comparative Examples, and Reference Examples are as follows.

Powder X-ray diffractometer: MAC Science Ltd., powder X-ray diffractometer MO3XHF$^{22}$, using the Cu k α line, voltage of 40 kV, current of 30 mA, scanning steps of 0.02°, and scanning speed of 2°/min.

$SiO_2/Al_2O_3$ ratio: the beta zeolite is dissolved using hydrofluoric acid (HF), and the dissolved liquid is analyzed using an ICP and the Al is measured. Further, the beta zeolite is dissolved using potassium hydroxide (KOH), and the dissolved liquid is analyzed using ICP and the Si is measured. The $SiO_2/Al_2O_3$ ratio is calculated based on the measured amounts of Si and Al.

BET surface area, micropore specific surface area, and micropore volume measurement apparatus: Quantachrome Instruments Co. AUTOSORB-1

Example 1

(1) Production of the Beta Zeolite Before Substitution

This is an example of the production of an Fe(II)-substituted beta zeolite where the $SiO_2/Al_2O_3$ ratio is 9.4. In 12.71 g of purified water, 0.801 g of sodium aluminate, and 1.443 g of 36% sodium hydroxide were dissolved. 3.048 g of fine powder silica, and 0.305 g of beta zeolite seed crystals with a $SiO_2/Al_2O_3$ ratio=24.0 were mixed, and added gradually to the above described aqueous solution with stirring and mixing, and a reaction mixture with a composition of $SiO_2/Al_2O_3$=18.0, $Na_2O/SiO_2$=0.20, $H_2O/SiO_2$=15 was obtained. These beta zeolite seed crystals are ones which were obtained by the method described below using an SDA. This reaction mixture was introduced into a 60 cc stainless steel closed container, and without aging or stirring, was heated at standing under self pressurization for 60 hrs at 150° C. After cooling the closed container, the product was filtered and washed with warm water and a white powder was obtained. Upon carrying out XRD measurements for this product, this product was confirmed to be a beta zeolite not containing impurities such as an SDA or the like. The physical properties of the beta zeolite before substitution obtained in this way are shown in Table 1.

[Production Method of the Beta Zeolite Seed Crystals]

Using tetraethylammonium hydroxide as an SDA, sodium aluminate as an alumina source, finely powdered silica (Mizusakil P707) as a silica source, by the method of the prior art, a beta zeolite with an $SiO_2/Al_2O_3$ ratio of 24.0 was synthesized carrying out stirring and heating for 96 hours at 165° C. This was calcined for 10 hours at 550° C. in an electric furnace with air circulation, and crystals not containing organic compounds were produced. From the X-ray diffraction results, it was confirmed that these crystals are a beta zeolite. As a result of observing these crystals with a scanning electron microscope, the average particle size was 280 nm. This beta zeolite is one which does not contain an SDA.

(2) Production of the Fe(II)-Substituted Beta Zeolite 60 ml of distilled water, 1 g of beta zeolite before substitution, and ascorbic acid in an amount of 2 times the mol number of an added iron compound were added to a polypropylene container, and after this, Fe(II) $SO_4 \cdot 7H_2O$ was added at 38 mass % with respect to the beta zeolite before substitution, and this was stirred for one day at room temperature under a nitrogen atmosphere. After this, the precipitate was suction filtered, washed with distilled water, and then dried, and an Fe(II)-substituted beta zeolite supporting 0.324 mmol/g of $Fe^{2+}$ was obtained. The supported amount of $Fe^{2+}$ was determined by the above described method. When carrying out the XRD measurement for the obtained Fe(II)-substituted beta zeolite, it was observed that the peak position and peak intensity were almost unchanged from the beta zeolite before substitution, and it was confirmed that the structure of the beta zeolite before substitution was maintained even after the ion exchange.

(3) Evaluation as a Hydrocarbon Reforming/Trapping Material

Figure 2:
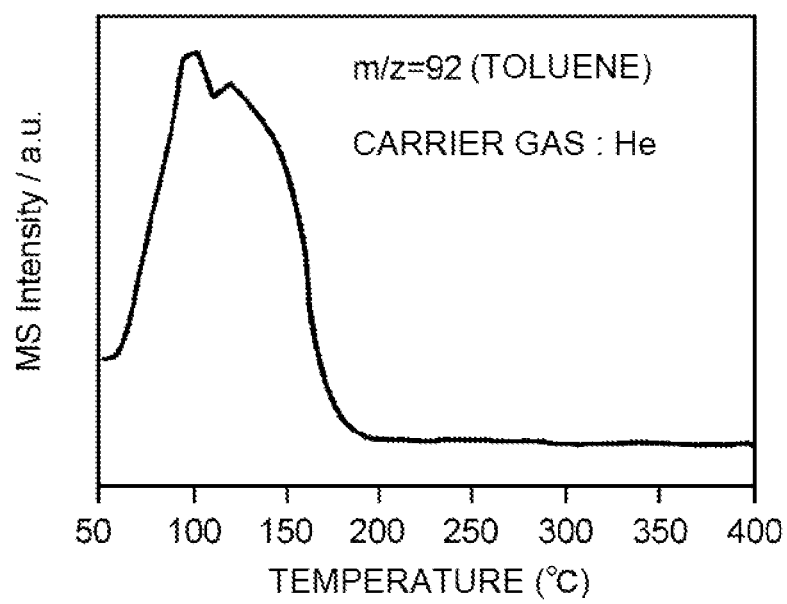
FIG. 2 is a graph showing the results of carrying out thermal desorption measurements after saturated adsorption of toluene on the Fe(II)-substituted beta zeolite obtained in Example 1, where the desorbed toluene was analyzed by Q-MASS (the carrier gas was He).
Figure 3:
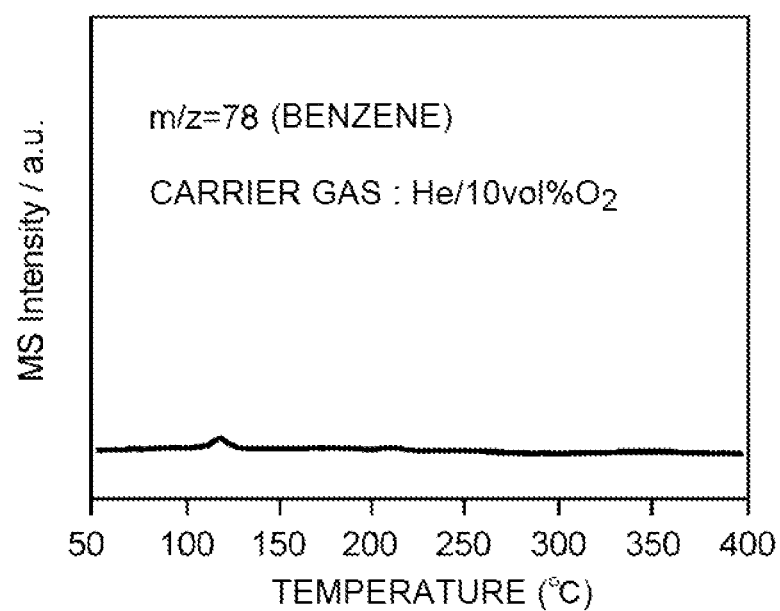
FIG. 3 is a graph showing the results of carrying out thermal desorption measurements after saturated adsorption of toluene on the Fe(II)-substituted beta zeolite obtained in Example 1, where the desorbed benzene was analyzed by Q-MASS (the carrier gas was He/10 vol % $O_2$).
Figure 4:
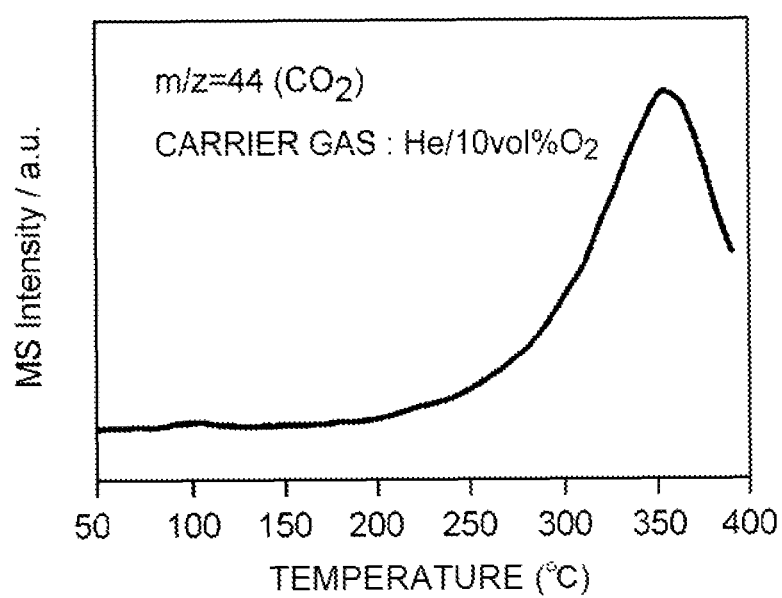
FIG. 4 is a graph showing the results of carrying out thermal desorption measurements after saturated adsorption of toluene on the Fe(II)-substituted beta zeolite obtained in Example 1, where the desorbed carbon dioxide was measured by Q-MASS (the carrier gas was He/10 vol % $O_2$).

Toluene, which is representative of a hydrocarbon gas included in the exhaust gas emitted from an internal combustion engine, was used as the subject of adsorption. 20 mg of the Fe(II)-substituted beta zeolite were introduced into a U-shaped glass reaction tube, and heat treatment was carried out at 390° C. for 1 hour. Next, toluene was adsorbed at 50° C. until a saturated state was reached. After this, temperature programmed desorption measurement (TPD; TCD detector) at 10 K/min up to 390° C. was carried out, and the adsorption•desorption characteristics were evaluated. At the same time, using a quadrupole mass spectrometer (Q-MASS), the gas component after desorption was analyzed. As the carrier gas, He gas (in the case of toluene, refer to FIG. 2), and a mixed gas of He/10 vol % $O_2$ (in the case of benzene and carbon dioxide, refer to FIG. 3 and FIG. 4) were used. The results thereof are shown in FIG. 2 to FIG. 4. In FIG. 2, He gas is used as the carrier gas, and from these figures, it is understood that the toluene adsorbed on an Fe(II)-substituted beta zeolite, by heating, except for a small portion which is reformed to benzene, is completely oxidized to carbon dioxide. Further, while not shown in this figure, according to analysis of the gas component after desorption by Q-MASS, products of xylene and methane were not observed. This strongly suggests that, in the case of using the Fe(II)-substituted beta zeolite of the present invention as a toluene reforming/trapping material, the products of the reforming are only carbon dioxide and benzene.

Further, from the measurement results of Q-MASS, the ratio of the peak area of carbon dioxide (arbitrary units) with respect to the adsorbed amount of toluene (arbitrary units) is calculated, and the relative intensity when the value of the later described Comparative Example 1 is 1.0 was determined. This relative intensity is used as an indicator of the degree of reforming of toluene. A higher value of this relative intensity, indicates a more complete oxidation from toluene to carbon dioxide. The results thereof are shown in Table 1.

Example 2

(1) Production of the Beta Zeolite Before Substitution

This is an example of the production of an Fe(II)-substituted beta zeolite where the $SiO_2/Al_2O_3$ ratio is 10.6. In 114.5 g of purified water, 1.864 g of sodium aluminate, and 11.528 of 50% sodium hydroxide were dissolved. 16.082 g of powdered silica, and 1.608 g of beta zeolite seed crystals with an. $SiO_2/Al_2O_3$ ratio of 24.0 were mixed, and added gradually to the above-described aqueous solution with stirring and mixing, and a reaction mixture with a composition of $SiO_2/Al_2O_3$=40, $Na_2O/SiO_2$=0.3, and $H_2O/SiO_2$=25 was obtained. These beta zeolite seed crystals are the same as those used in Example 1. This reaction mixture was introduced into a 300 cc stainless steel closed container, and heated at standing under self-pressurization for 48 hours at 140° C. without aging or stirring. After cooling the closed container, the product was filtered and washed with warm water and a white powder was obtained. When X-ray diffraction measurements were carried out for this product, it was confirmed to be a beta zeolite not including impurities such as an SDA. The physical properties of the beta zeolite before substitution obtained in this way are shown in Table 1.

(2) Production of the Fe(II)-Substituted Beta Zeolite

After having added 40 ml of distilled water, 1 g of beta zeolite before substitution, and twice the mol number of ascorbic acid as the added iron compound to a polypropylene vessel, $Fe(II)SO_4.7H_2O$ was added at 37 mass % with respect to the beta zeolite before substitution, and this was stirred for 1 day at room temperature under a nitrogen atmosphere. After this, the precipitate was suction filtered, and after washing with distilled water, it was dried to provide an Fe(II)-substituted beta zeolite supporting 0.419 mmol/g of $Fe^{2+}$. The supported amount of $Fe^{2+}$ was determined by the above described method. When XRD measurements were carried out for the obtained Fe(II)-substituted beta zeolite, it was observed that the peak position and peak intensity were almost unchanged from those of the beta zeolite before substitution, and it was confirmed that the structure of the beta zeolite was maintained even after the ion exchange. The obtained Fe(II)-substituted beta zeolite was evaluated in the same way as for Example 1. The results thereof are shown in Table 1.

Comparative Example 1

(1) Production of the Beta Zeolite Before Substitution

The present comparative example is an example of the production of an Fe(II)-substituted beta zeolite where the $SiO_2/Al_2O_3$ ratio is 12.4. In the present comparative example, the beta zeolite before substitution produced in Example 1 was subjected to the treatment below.

The beta zeolite was dispersed in an ammonium nitrate aqueous solution. The mass ratio of the beta zeolite, the ammonium nitrate and water was 1:2:50. Ion exchange was carried out by allowing this dispersion to stand for 24 hours under conditions of heating to 80° C. After this, filtering was carried out, and the beta zeolite was separated by filtration. After repeating the ion exchange and filtering operations one more time, washing with water and drying at 80° C., an ammonium type beta zeolite was obtained.

This ammonium type beta zeolite under conditions of heating at 700° C., was subjected to continuous circulation of a mixed gas of argon and steam for 24 hours, and by exposure to steam, a proton type beta zeolite was obtained.

The obtained proton type beta zeolite was subjected to acid treatment with a 0.1 mol/L nitric acid aqueous solution. The temperature of the nitric acid aqueous solution was set to 60° C. The nitric acid aqueous solution was added at 10 mL with respect to 0.1 g of the beta zeolite. The treatment was carried out over 2 hours while stirring the solution with a magnetic stirrer. In this way, a proton type beta zeolite where the $SiO_2/Al_2O_3$ ratio is 12.4 was obtained.

1 g of this proton type beta zeolite was dispersed in 15 ml of a 1 mol/L sodium nitrate solution, and after stirring over 24 hours under conditions of heating to 80° C., filtering was carried out, then washing with water and drying at 80° C., to obtain a sodium type beta zeolite. The physical properties of the beta zeolite before substitution obtained in this way are shown in Table 1.

(2) Production of the Fe(II)-Substituted Beta Zeolite

After having added 40 ml of distilled water, 1 g of beta zeolite before substitution, and twice the mol number of ascorbic acid as the added iron compound to a polypropylene vessel, $Fe(II)SO_4.7H_2O$ was added at 30 mass % with respect to the beta zeolite before substitution, and this zeolite was stirred for 1 day at room temperature under a nitrogen atmosphere. After this, the precipitate was suction filtered, and after washing with distilled water, it was dried to provide an Fe(II)-substituted beta zeolite supporting 0.114 mmol/g of $Fe^{2+}$. The supported amount of $Fe^2$ was determined by the above described method. When XRD measurements were carried out for the obtained Fe(II)-substituted beta zeolite, it was observed that the peak position and peak intensity were almost unchanged from those of the beta zeolite before substitution, and it was confirmed that the structure of the beta zeolite was maintained even after ion exchange. The obtained Fe(II)-substituted beta zeolite was evaluated in the same way as for Example 1. The results thereof are shown in Table 1.

Comparative Example 2

(1) Production of the Beta Zeolite Before Substitution

The present comparative example is an example of the production of an Fe(II)-substituted beta zeolite where the $SiO_2/Al_2O_3$ ratio is 25.0. In the present comparative example, the beta zeolite before substitution produced in Example 1 was subjected to the treatment below.

The beta zeolite was dispersed in an ammonium nitrate aqueous solution. The mass ratio of the beta zeolite, the ammonium nitrate and water was 1:2:50. Ion exchange was carried out by allowing this dispersion to stand for 24 hours under conditions of heating to 80° C. After this, filtering was carried out, and the beta zeolite was separated by filtration. After repeating the ion exchange and filtering operations one more time, washing with water and drying at 80° C. were performed to obtain an ammonium type beta zeolite.

This ammonium type beta zeolite under conditions of heating at 700° C., was subjected to continuous circulation of a mixed gas of argon and steam for 24 hours, and by exposure to steam, a proton type beta zeolite was obtained.

The obtained proton type beta zeolite was subjected to acid treatment with a 0.7 mol/L nitric acid aqueous solution. The temperature of the nitric acid aqueous solution was set to 60° C. The nitric acid aqueous solution was added at 10 mL with respect to 0.1 g of the beta zeolite. The treatment was carried out over 2 hours while stirring the solution with a magnetic stirrer. In this way, a proton type beta zeolite where the $SiO_2/Al_2O_3$ ratio is 25.0 was obtained.

1 g of this proton type beta zeolite was dispersed in 15 ml of a 1 mol/L sodium nitrate solution, and after stirring over 24 hours under conditions of heating to 80° C., filtering was carried out, then washing with water and drying at 80° C., to obtain a sodium type beta zeolite. The physical properties of the beta zeolite before substitution obtained in this way are shown in Table 1.

(2) Production of the Fe(II)-Substituted Beta Zeolite

After having added 40 ml of distilled water, 1 g of beta zeolite before substitution, and twice the mol number of ascorbic acid as the added iron compound to a polypropylene vessel, $Fe(II)SO_4.7H_2O$ was added at 17 mass % with respect to the beta zeolite before substitution, and this was stirred for 1 day at room temperature under a nitrogen atmosphere. After this, the precipitate was suction filtered, and after washing with distilled water, it was dried to provide an Fe(II)-substituted beta zeolite supporting 0.058 mmol/g of $Fe^{2+}$. The supported amount of $Fe^{2+}$ was determined by the above described method. When XRD measurements were carried out for the obtained Fe(II)-substituted beta zeolite, it was observed that the peak position and peak intensity were almost unchanged from those of the beta zeolite before substitution, and it was confirmed that the structure of the beta zeolite was maintained even after ion exchange. The obtained Fe(II)-substituted beta zeolite was evaluated in the same way as for Example 1. The results thereof are shown in Table 1.

TABLE 1

| | Beta zeolite before substitution | | | Fe(II)-substituted beta zeolite | | | | | |
|---|---|---|---|---|---|---|---|---|---|
| | $SiO_2/Al_2O_3$ | BET specific surface area ($m^2/g$) | micropore specific surface area ($m^2/g$) | micropore volume ($cm^3/g$) | $SiO_2/Al_2O_3$ | BET specific surface area ($m^2/g$) | micropore specific surface area ($m^2/g$) | micropore volume ($cm^3/g$) | Fe(II) supported amount (mmol/g) | hydrocarbon reforming/ trapping characteristic |
| Example1 | 9.4 | 534 | 391 | 0.206 | 9.4 | 479 | 380 | 0.198 | 0.324 | 16.1 |
| Example2 | 10.6 | 528 | 430 | 0.226 | 10.6 | 462 | 342 | 0.179 | 0.419 | 15.5 |
| Comparative Example1 | 12.4 | 405 | 303 | 0.160 | 12.4 | 385 | 275 | 0.145 | 0.114 | 1.0 |
| Comparative Example2 | 25.0 | 588 | 421 | 0.222 | 25.0 | 566 | 365 | 0.191 | 0.058 | 2.0 |

As is clear from the results shown in Table 1, it can be understood that by using the Fe(II)-substituted beta zeolite obtained in each of the examples, it is possible to completely oxide toluene to carbon dioxide. In contrast, it can be understood that by using the Fe(II)-substituted beta zeolite obtained in the comparative examples, toluene is not oxidized to carbon dioxide.

The invention claimed is:

1. A hydrocarbon reforming/trapping material comprising an Fe(II)-substituted beta zeolite which is produced by a method comprising the step of ion-exchanging a beta zeolite with Fe(II) ions alone, where an $SiO_2/Al_2O_3$ ratio is from 7 to 12,
   wherein the Fe(II)-substituted beta zeolite has a BET specific surface area of 300 to 600 $m^2/g$, a micropore specific surface area of 270 to 500 $m^2/g$, and a micropore volume of 0.14 to 0.25 $cm^3/g$, the Fe(II)-substituted beta zeolite comprises ferric oxide (III) on the surface thereof, and
   the Fe(II)-substituted beta zeolite is a beta zeolite obtained by ion exchanging with Fe(II) ions a beta zeolite produced by using a reaction mixture which does not include a structure-directing agent.

2. A hydrocarbon reforming/trapping material according to claim 1, wherein a supported amount of Fe(II) is 0.001 to 0.5 mmol/g with respect to the Fe(II)-substituted beta zeolite.

3. A hydrocarbon reforming/trapping material according to claim 1, wherein, as a beta zeolite before being ion-exchanged with Fe(II) ions, a beta zeolite having a $SiO_2/Al_2O_3$ ratio from 7 to 12 is used.

4. A hydrocarbon reforming/trapping material according to claim 2, wherein, as a beta zeolite before being ion-exchanged with Fe(II) ions, a beta zeolite having a $SiO_2/Al_2O_3$ ratio from 7 to 12 is used.

5. A hydrocarbon reforming/trapping material according to claim 1, comprising lithium ions.

6. A hydrocarbon reforming/trapping material according to claim 2, comprising lithium ions.

7. A hydrocarbon reforming/trapping material according to claim 3, comprising lithium ions.

8. A hydrocarbon reforming/trapping material according to claim 4, comprising lithium ions.

9. A method of removing a hydrocarbon, comprising contacting an Fe(II)-substituted beta zeolite which has been ion-exchanged with Fe(II) ions and where an $SiO_2/Al_2O_3$ ratio is from 7 to 12, with a hydrocarbon or a gas comprising a hydrocarbon, so that the hydrocarbon is adsorbed on the Fe(II)-substituted beta zeolite, and
   heating the Fe(II)-substituted beta zeolite on which the hydrocarbon is adsorbed under the presence of oxygen, so that the Fe(II)-substituted beta zeolite reforms and removes the hydrocarbon.

10. A method of removing a hydrocarbon according to claim 9, wherein the hydrocarbon is emitted from an internal combustion engine.

11. A method of removing a hydrocarbon according to claim 10, wherein the hydrocarbon comprises toluene, and the toluene is reformed to carbon dioxide and removed.

\* \* \* \* \*